US012730483B2

(12) United States Patent
Kim et al.

(10) Patent No.: US 12,730,483 B2
(45) Date of Patent: Sep. 8, 2026

(54) ELECTRONIC DEVICE COMPRISING FLEXIBLE DISPLAY HAVING EXPANDABLE DISPLAY AREA

(71) Applicant: Samsung Electronics Co., Ltd., Suwon-si (KR)

(72) Inventors: Chungha Kim, Suwon-si (KR); Sungkwon Kim, Suwon-si (KR); Sangmin Hyun, Suwon-si (KR); Geunyong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/654,402

(22) Filed: May 3, 2024

(65) Prior Publication Data

US 2024/0288910 A1 Aug. 29, 2024

Related U.S. Application Data

(63) Continuation of application No. 18/298,078, filed on Apr. 10, 2023, now Pat. No. 11,977,418, which is a (Continued)

(30) Foreign Application Priority Data

Nov. 29, 2017 (KR) ........................ 10-2017-0161471

(51) Int. Cl.
*G06F 1/16* (2006.01)
*G09F 9/30* (2006.01)
*H04M 1/02* (2006.01)

(52) U.S. Cl.
CPC .......... *G06F 1/1675* (2013.01); *G06F 1/1626* (2013.01); *G06F 1/1652* (2013.01); *G09F 9/301* (2013.01); *H04M 1/0268* (2013.01)

(58) Field of Classification Search
CPC combination set(s) only.
See application file for complete search history.

(56) References Cited

U.S. PATENT DOCUMENTS 7,639,237 B2 12/2009 Perkins
8,711,566 B2 * 4/2014 O'Brien ................ G06F 1/1652 361/724

(Continued)

FOREIGN PATENT DOCUMENTS

CN 106713554 A 5/2017
KR 10-2014-0059274 A 5/2014

(Continued)

OTHER PUBLICATIONS

Extended European Search Report dated Oct. 22, 2020, issued in European Application No. 18883778.5-1216.

(Continued)

*Primary Examiner* — Lisa Lea-Edmonds
(74) *Attorney, Agent, or Firm* — Jefferson IP Law, LLP

(57) ABSTRACT

The disclosure discloses an electronic device including a flexible display having an expandable display area. The disclosed electronic device may include: a housing including a first cover disposed to face a first direction, a second cover disposed to face a second direction opposite to the first direction, and a side member enclosing at least part of a space between the first and second covers; a slider to be inserted or withdrawn by being disposed to at least part of an area of the first cover of the housing; a flexible display disposed in the slider such that at least part thereof is exposed, and disposed to allow a display area to be expanded according to the withdrawing of the slider and allow the expanded display area to be hidden inside the housing; and a support body mounted closely in contact on a bottom face of the flexible display, supporting the expanded display area as a prop when the slider is with- (Continued)

drawn, and disposed to be housed inside the housing together with the expanded display area when the slider is inserted.

15 Claims, 11 Drawing Sheets

Related U.S. Application Data continuation of application No. 17/517,216, filed on Nov. 2, 2021, now Pat. No. 11,630,490, which is a continuation of application No. 16/766,089, filed as application No. PCT/KR2018/014808 on Nov. 28, 2018, now Pat. No. 11,194,363.

(56) References Cited

U.S. PATENT DOCUMENTS 9,195,272 B2* 11/2015 O'Brien .............. H04M 1/0268
9,286,812 B2 3/2016 Bohn et al.
9,911,369 B2 3/2018 Kim et al.
10,025,355 B2 7/2018 Bohn et al.
10,079,270 B2 9/2018 Lee
10,111,346 B2 10/2018 Seo et al.
10,162,387 B2 12/2018 Takayanagi et al.
10,194,543 B2* 1/2019 Seo .......................... G09F 9/301
10,209,742 B2 2/2019 Shin
10,321,583 B2* 6/2019 Seo .......................... H04N 5/64
10,416,796 B2 9/2019 Song
10,488,957 B2 11/2019 Kim et al.
10,499,515 B2 12/2019 Lee
10,553,135 B2 2/2020 Lee et al.
10,684,714 B2* 6/2020 Seo ....................... G06F 1/3262
10,754,386 B2 8/2020 Lee et al.
10,881,009 B2* 12/2020 Jiang ..................... G06F 1/1624
10,977,771 B2 4/2021 Jeong et al.
11,630,490 B2* 4/2023 Kim ...................... G06F 1/1624 361/679.02
11,775,013 B2 10/2023 Cho et al.
11,977,418 B2* 5/2024 Kim .................... H04M 1/0237
2006/0176243 A1* 8/2006 Yeh ....................... G06F 1/1624 345/30
2010/0167791 A1 7/2010 Lim
2012/0212433 A1* 8/2012 Lee ....................... G06F 1/1643 345/173
2013/0058063 A1* 3/2013 O'Brien ................ G06F 1/1624 361/807
2014/0029190 A1 1/2014 Sato et al.
2014/0211399 A1* 7/2014 O'Brien ................ G06F 1/1652 29/592.1
2016/0081204 A1 3/2016 Park et al.
2016/0100478 A1 4/2016 Lee
2016/0202781 A1 7/2016 Kim et al.
2017/0064847 A1 3/2017 Lim
2017/0329369 A1 11/2017 Takayanagi et al.
2020/0152095 A1 5/2020 Lee et al.
2020/0253063 A1* 8/2020 Jiang ................... H04M 1/0268
2021/0135492 A1 5/2021 Kim et al.
2023/0244279 A1* 8/2023 Kim ...................... G06F 1/1675 361/679.02
2024/0288910 A1* 8/2024 Kim ...................... G06F 1/1652

FOREIGN PATENT DOCUMENTS

KR 10-2015-0099668 A 9/2015
KR 10-1562582 B1 10/2015
KR 10-2016-0031363 A 3/2016
KR 10-2016-0041159 A 4/2016
KR 10-2016-0087460 A 7/2016

OTHER PUBLICATIONS

Korean Office Action dated Oct. 27, 2021, issued in Korean Application No. 10-2017-0161471.
Korean Notice of Patent Grant dated Mar. 22, 2022, issued in Korean Patent Application No. 10-2017-0161471.
European Search Report dated Feb. 23, 2023, issued in European Application No. 22207264.7.
Extended European Search Report dated Mar. 4, 2025, issued in European Application No. 24215669.3.
European Office Action dated Nov. 26, 2025, issued in European Patent Application No. 24215669.3.
European Office Action dated Jul. 2, 2026, issued in European Patent Application No. 24 215 669.3.

* cited by examiner

ELECTRONIC DEVICE COMPRISING FLEXIBLE DISPLAY HAVING EXPANDABLE DISPLAY AREA

CROSS-REFERENCE TO RELATED APPLICATION(S)

This application is a continuation application of prior application Ser. No. 18/298,078, filed on Apr. 10, 2023, which has issued as U.S. Pat. No. 11,977,418 on May 7, 2024, which is a continuation application of prior application Ser. No. 17/517,216, filed on Nov. 2, 2021, which has issued as U.S. Pat. No. 11,630,490 on Apr. 18, 2023, which is a continuation application of prior application Ser. No. 16/766,089, filed on May 21, 2020, which has issued as U.S. Pat. No. 11,194,363 on Dec. 7, 2021, which is a U.S. National Stage application under 35 U.S.C. § 371 of an International Application number PCT/KR2018/014808, filed on Nov. 28, 2018, which is based on and claims priority of a Korean patent application number 10-2017-0161471, filed on Nov. 29, 2017, in the Korean Intellectual Property Office, the disclosure of which is incorporated by reference herein in its entirety.

TECHNICAL FIELD

Various embodiments of the disclosure relate to an electronic device including a flexible display having an expandable display area.

BACKGROUND ART

An electronic device may include a flexible display to expand a display area of the flexible display. For example, the flexible display may be mounted on the electronic device in a curved, foldable, or rollable manner.

For example, the flexible display may be mounted with a rolling type inside the electronic device to provide an expanded display area when the flexible display is withdrawn. The expanded display area may provide a new user interfacing environment.

DISCLOSURE OF INVENTION

Technical Problem

However, the electronic device including the flexible display may not have good smoothness of the expanded display area.

In particular, the electronic device including the conventional flexible display may be scratched on a surface due to interference in a process of expanding the display area.

Solution to Problem

Various embodiments of the disclosure may provide a device capable of maintaining smoothness of an expanded display area of a flexible display.

Various embodiments of the disclosure may provide an electronic device capable of preventing a surface scratch of a flexible display.

Various embodiments of the disclosure may provide an electronic device capable of sufficiently ensuring a space for mounting a component inside a main body.

Various embodiments of the disclosure may provide a new interfacing environment to a user by providing various screen ratios of a display area.

An electronic device according to various embodiments of the disclosure may include: a housing including a first cover disposed to face a first direction, a second cover disposed to face a second direction opposite to the first direction, and a side member enclosing at least part of a space between the first and second covers; a slider to be inserted or withdrawn by being disposed to at least part of an area of the first cover of the housing; a flexible display disposed in the slider such that at least part thereof is exposed, and disposed to allow a display area to be expanded according to the withdrawing of the slider and allow the expanded display area to be hidden inside the housing; and a support body mounted closely in contact on a bottom face of the flexible display, supporting the expanded display area as a prop when the slider is withdrawn, and disposed to be housed inside the housing together with the expanded display area when the slider is inserted.

Advantageous Effects of Invention

An electronic device according to various embodiments of the disclosure can maintain smoothness of an expanded display area, and can prevent a surface scratch of the expanded display area when inserted/withdrawn.

In addition, an electronic device according to various embodiments of the disclosure can provide various screen ratios of a display area to provide a new user interfacing environment.

BEST MODE FOR CARRYING OUT THE INVENTION

Figure 1:
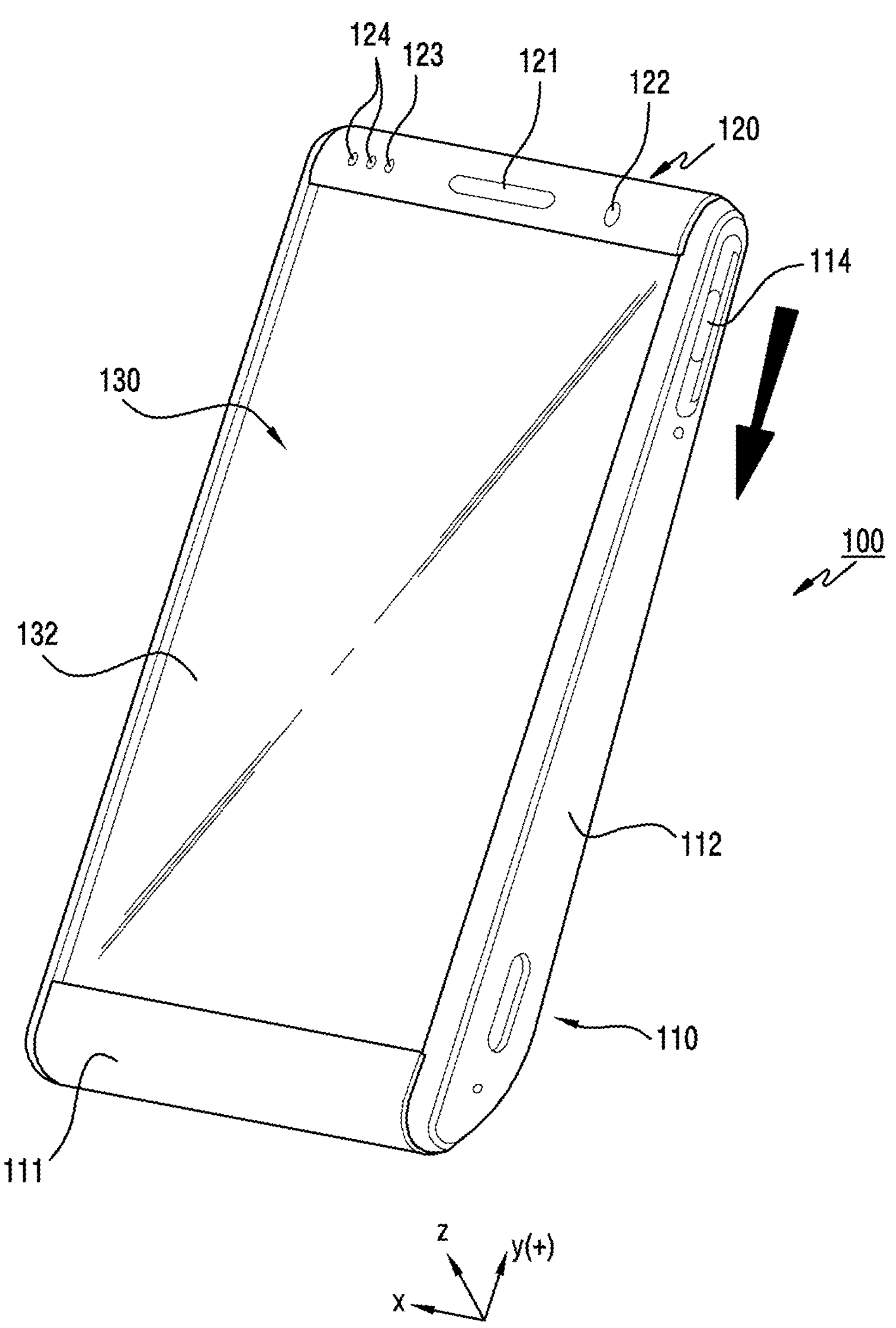
FIG. 1 is a perspective view illustrating an electronic device in which a slider is inserted according to various embodiments of the disclosure.

Hereinafter, various embodiments of the disclosure are described with reference to the accompanying drawings.

However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements.

An electronic device according to various embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), electronic clothes, an electronic bracelet, an electronic necklace, an electronic appcessory, an electronic tattoo, a smart mirror, or a smart watch).

Figure 2:
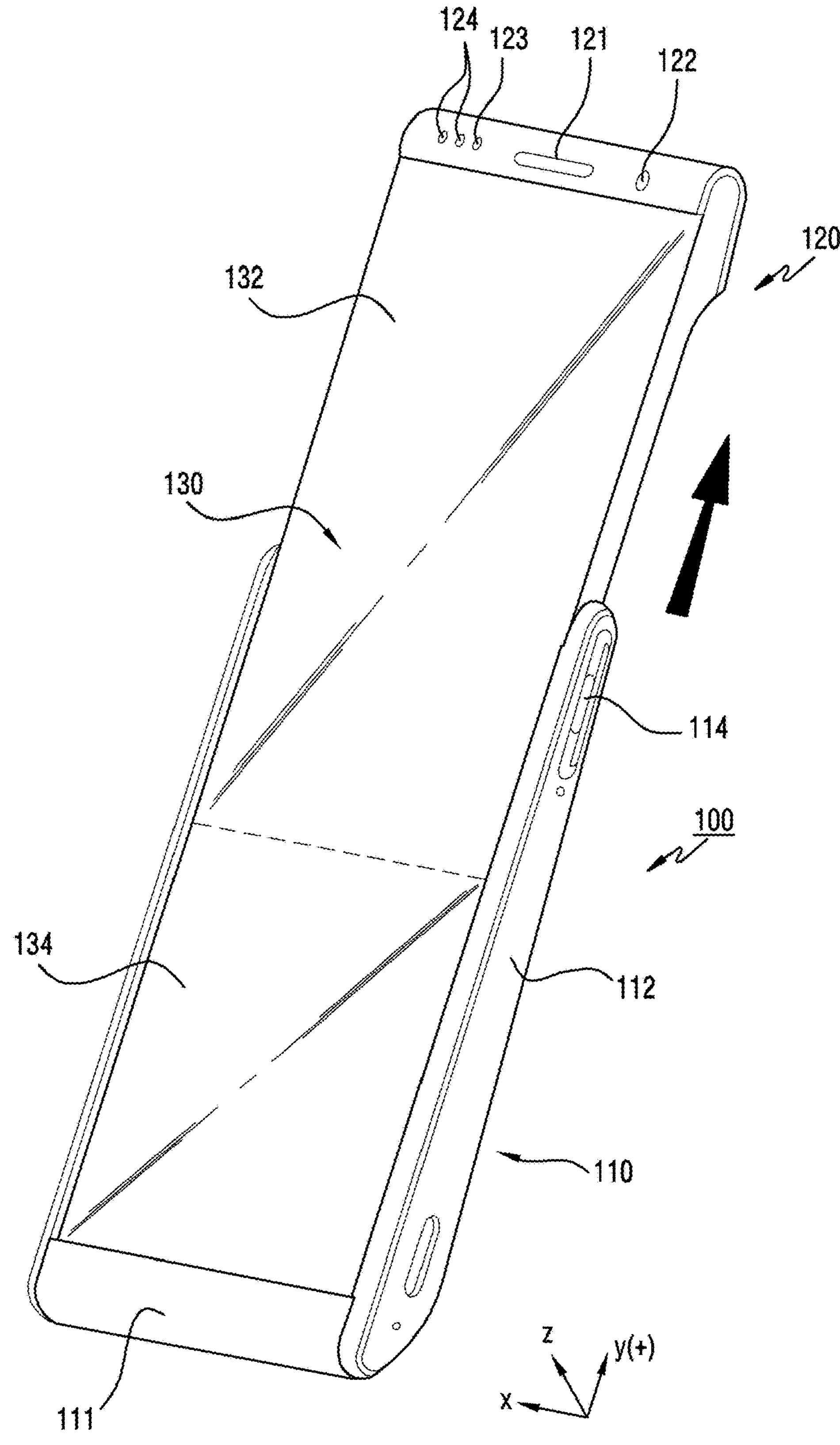
FIG. 2 is a perspective view illustrating an electronic device in which a slider is withdrawn to expand a display area according to various embodiments of the disclosure.

FIG. 1 is a perspective view illustrating an electronic device in which a slider is inserted according to various embodiments of the disclosure. FIG. 2 is a perspective view illustrating an electronic device in which a slider is withdrawn to expand a display area according to various embodiments of the disclosure.

Referring to FIG. 1 and FIG. 2, an electronic device 100 according to various embodiments of the disclosure may include a main body 110, a slider 120, and a flexible display 130. The slider 120 may be inserted to or withdrawn from the main body 110. FIG. 1 illustrates a state where the slider 120 is inserted to the main body 110, and FIG. 2 illustrates a state where the slider 120 is withdrawn from the main body 110. A Cartesian coordinate system is used, where an X-axis may be a horizontal direction of the electronic device 100, a Y-axis may be a vertical direction of the electronic device 100, and a Z-axis may be a thickness direction of the electronic device 100. A Y(+)-axis may mean a direction of withdrawing the slider 120. A Y(−)-axis may mean a direction of inserting the slider 120. An X-axis may mean a direction of a rotation axis of first and second rollers, and a direction of disposing a protrusion portion.

The main body 110 according to various embodiments may include a housing 111. The housing 111 according to various embodiments may include a first face (a first cover or a front face) facing a first direction, a second face (a second cover or a bottom face) facing a second direction opposite to the first direction, and a side member 112 enclosing at least part of a space surrounded by the first and second faces. The first direction may refer to a vertical upward direction of the flexible display 130, and the second direction may refer to a vertical downward direction of the flexible display 130. For example, the slider 120 may be disposed to be exposed in a first direction of the housing 111, and the flexible display 130 may be disposed to be exposed in a first direction of the slider 120.

The housing 111 according to various embodiments may include a printed circuit board, a battery, an antenna, a connector hole, and at least one key input device, or the like (not shown).

The key input device according to various embodiments may include a home key (not shown) disposed to the housing 110 and/or a side key button 114 disposed to the side member 112 of the housing 111. In another embodiment, the electronic device 100 may not include all or some of the aforementioned key input devices, and the key input device not included may be implemented on the flexible display 130 in other forms such as soft keys.

A connector hole (not shown) according to various embodiments may include a first connector hole (not shown) capable of housing a connector (e.g., a USB connector) for transmitting and receiving power and/or data with respect to an external electronic device, and/or a second connector hole (e.g., an earphone jack) (not shown) capable of housing a connector for transmitting and receiving an audio signal with respect to the external electronic device.

The slider 120 according to various embodiments may be withdrawn from the housing 111 while maintaining a horizontal state, and may be inserted to the housing 111 while maintaining the horizontal state. For example, a driving source for inserting or withdrawing the slider 120 may be implemented to be manual, semi-automatic, or automatic. When the driving source for inserting/withdrawing the slider 120 is semi-automatic, the semi-automatic driving source may be constructed of an elastic body or the like. When the driving force for inserting/withdrawing the slider 120 is automatic, it may be constructed of a gear mechanism, a driving motor, or the like (see FIG. 9).

In the electronic device 100 according to various embodiments, a display area of the flexible display 130 may be expanded when the slider 120 is withdrawn from the housing 111. For example, the flexible display 130 may include a display area 132 exposed always and an expanded display area 134 expanded when the slider 120 is withdrawn.

The flexible display 130 according to various embodiments may be mounted to be exposed at least in part on an upper face of the slider 120, and one end thereof may be fixed to the slider 120. Thus, when the slider 120 is withdrawn, one end of the flexible display 130 is pulled in a withdrawing direction, thereby expanding the display area. When the slider 120 is inserted, the expanded display area 134 may be housed inside the housing 111. For example, a receiver 121, a camera module 122, an indicator 123, and at least one sensor 124 may be disposed to the upper face of the slider 120. The camera module 122 may be disposed to one side with respect to the receiver 121, and the indicator 123 and the sensor 124 may be disposed to the other side.

The camera 122 according to various embodiments may include one or more lenses, an image sensor, and/or an image signal processor. A rear camera and a flash (not shown) may be disposed to a second cover, i.e., a rear face, of the housing. The flash may include, for example, a Light Emitting Diode (LED) or a xenon lamp. In some embodiments, two or more lenses (wide angle and telephoto lenses) and image sensors may be disposed to one face of the electronic device 100.

At least one or more sensors 124 according to various embodiments may generate an electrical signal or data value corresponding to an internal operational state of the electronic device 100 or an external environmental state. The sensor 124 may include an optical sensor, e.g., a proximity sensor, and may include a fingerprint sensor, a biosensor, or the like (not shown). For example, the fingerprint sensor may be disposed to the first face (front face) or second face (rear face) of the housing 111. In addition, the electronic device 100 may further include at least one of senor modules (not shown), for example, a gesture sensor, a gyro sensor, an atmospheric pressure sensor, a magnetic sensor, an acceleration sensor, a grip sensor, a color sensor, an Infrared (IR) sensor, a temperature sensor, a humidity sensor, and an illuminance sensor.

The indicator 123 according to various embodiments may be disposed, for example, on a first face of the slider 120.

The indicator 123 may provide state information of the electronic device 100 in a form of light, and may include an LED.

Figure 3:
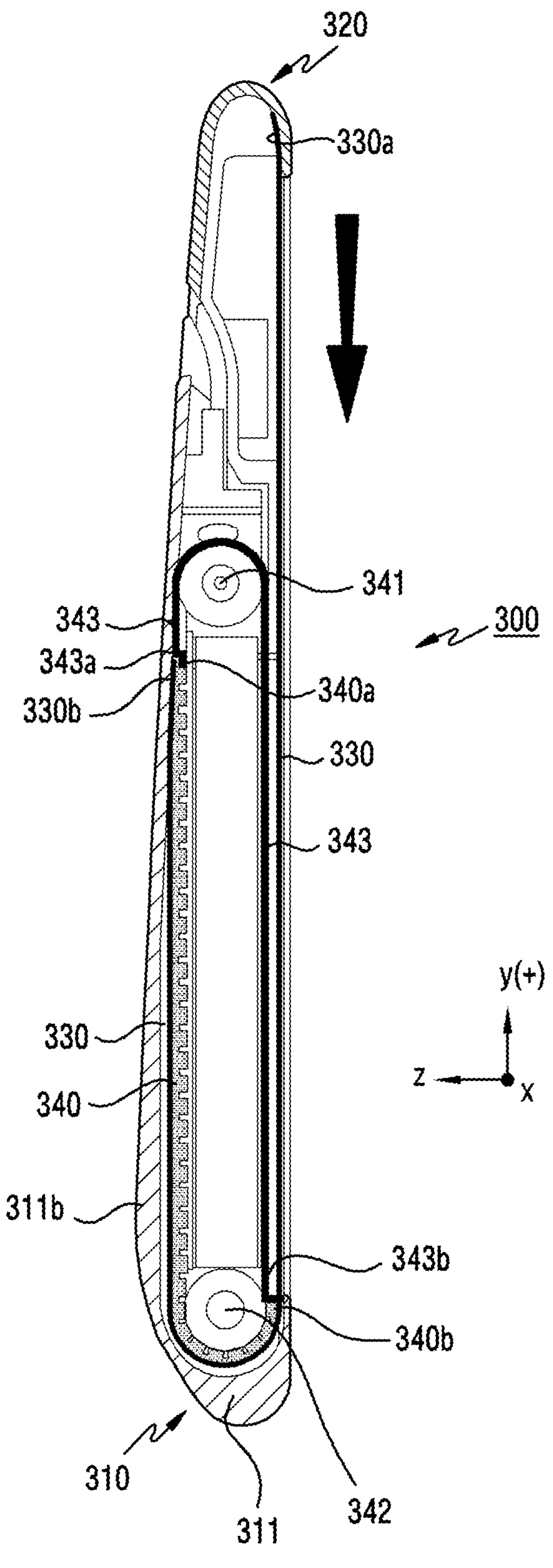
FIG. 3 is a cross-sectional view illustrating an electronic device in which a slider is inserted according to various embodiments of the disclosure.
Figure 4:
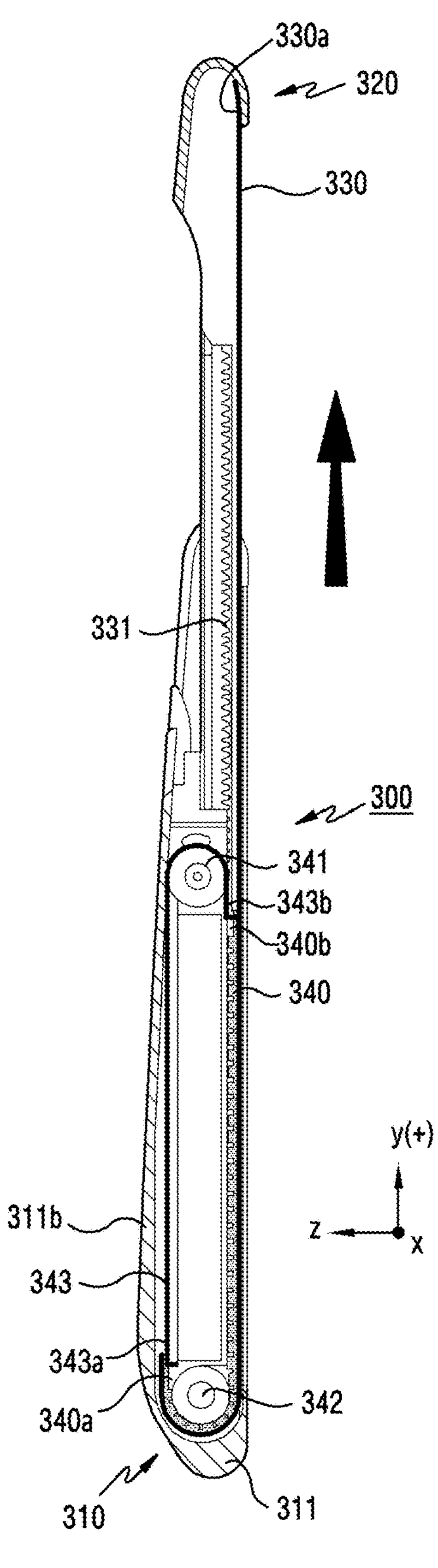
FIG. 4 is a cross-sectional view illustrating an electronic device in which a slider is withdrawn to expand a display area according to various embodiments of the disclosure.
Figure 5:
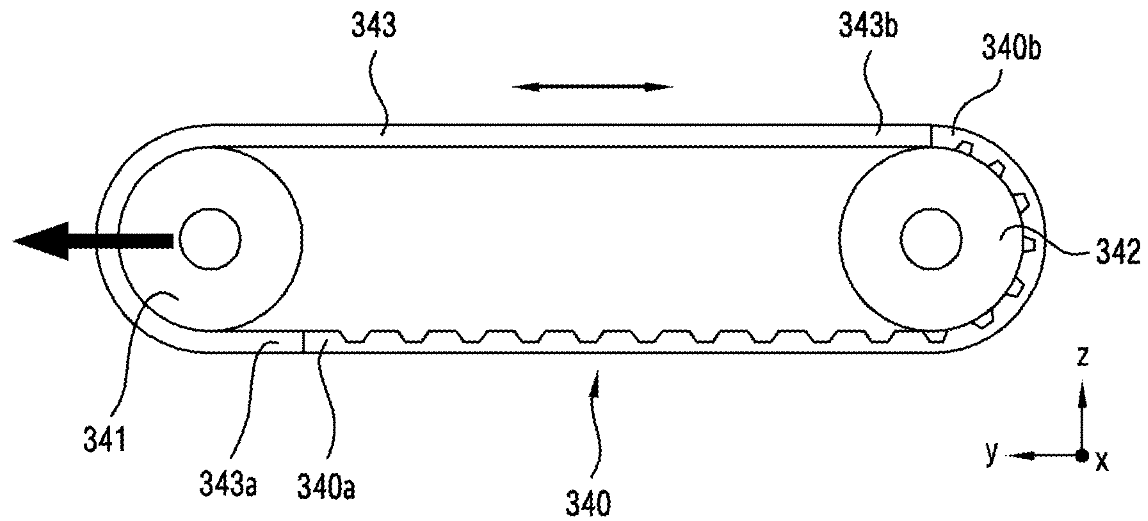
FIG. 5 is an exemplary view illustrating a structure of a smoothness maintaining device mounted on an electronic device according to various embodiments of the disclosure.

FIG. 3 is a cross-sectional view illustrating an electronic device in which a slider is inserted according to various embodiments of the disclosure. FIG. 4 is a cross-sectional view illustrating an electronic device in which a slider is withdrawn to expand a display area according to various embodiments of the disclosure. FIG. 5 is an exemplary view illustrating a structure of a smoothness maintaining device mounted on an electronic device according to various embodiments of the disclosure.

Referring to FIG. 3 to FIG. 5, an electronic device 300 according to various embodiments of the disclosure may be the same electronic device as the electronic device 100 of FIG. 1 and FIG. 2. The electronic device 300 according to various embodiments may include a support body 340 and a smoothness maintaining device to maintain smoothness of an expanded display area of the flexible display 330 when a slider 320 is withdrawn from a housing 311.

The support body 340 according to various embodiments may be disposed closely in contact with a bottom face of the expanded display area (134 of FIG. 2), and thus, when the expanded display area is exposed to the outside, may serve for a function of supporting the expanded display area, as a support base playing a role of a prop of the expanded display area. The support body 340 may be configured integrally in the expanded display area. For example, a detailed configuration for the support body 340 will be described with reference to FIG. 7A to FIG. 7C.

The smoothness maintaining device according to various embodiments may serve for a function of maintaining smoothness of the support body 340 to maintain smoothness of the expanded display area of a flexible display 330.

The flexible display 330 according to various embodiments may have one end 330*a* fixed to the slider 320 and the other end 330*b* fixed to the support body 340. Therefore, according to an operation of inserting or withdrawing the slider 330, the support body 340 and the expanded display area of the flexible display 330 may be withdrawn to the outside from the housing 311 or may be inserted into the housing 311.

The smoothness maintaining device of the expanded display area according to various embodiments may include first and second rollers 341 and 342 and a wire 343. The smoothness maintaining device may be disposed between the flexible display 330 exposed to the outside and a bottom face 311*b* of the housing 311. The first roller 341 may be constructed in pair, and the second roller 341 may be constructed in pair. The first and second rollers 341 and 342 may be disposed to face each other. Each of the first and second rollers 341 and 342 may be disposed in the housing 311 in a rotatable manner, and may include a bearing (not shown).

The smoothness maintaining device according to various embodiments may include the first roller 341 disposed at a first position of the housing 311, the second roller 342 disposed at a second position of the housing 311, and the wire 343 configured such that one end 343*a* and the other end 343*b* move in opposite directions from each other by means of the first roller 341.

The one end 343*a* of the wire according to various embodiments may be coupled to one end 340*a* of the support body 340, and the other end 343*b* of the wire may be coupled to the other end 340*b* of the support body. Thus, tension force is provided to pull both ends of the support body 340, thereby providing force for maintaining smoothness of the support body 340. Since the expanded display area of the flexible display 330 is disposed closely in contact with the support body 340, a structure of maintaining the smoothness of the support body 340 may maintain the smoothness of the expanded display area. The support body 340 is pulled in a direction in which both ends thereof are away from each other, thereby maintaining a taut state. The taut state (tight state) is a state where the support body retains tension, and may be referred to as a smoothness maintaining state.

The electronic device 300 according to various embodiments may have various components disposed to a mounting space between the support body 340 and the wire 343. For example, the component disposed to the space in the housing 311 may include a printed circuit board, a battery, an antenna, or the like.

In the wire 343 according to various embodiments, one end 343*a* and the other end 343*b* may move in opposite directions from each other by means of the first roller 341. For example, when the one end 343*a* of the wire moves toward the second roller 342, the other end 343*b* of the wire may move from a position around the second roller 342 to a position close to the second roller 342. Each of the one end 343*a* and the other end 343*b* of the wire may move in a direction parallel to the flexible display 330 while maintaining a specific interval. As will be described below, the first roller 341 is provided with elastic force in a direction away from the second roller 342, so that the wire 343 and the support body 340 always retain tension (tension force).

The first roller 341 according to various embodiments may be constructed in pair, and may be disposed substantially to an intermediate area of the housing 311 in a rotatable manner along a first rotation axis in a direction perpendicular to an inserting/withdrawing direction. The second roller 342 according to various embodiments may be disposed substantially to a lower end area of the housing 311 in a rotatable manner along a second rotation axis in a direction perpendicular to the inserting/withdrawing direction. The first and second rollers 341 and 342 may be disposed to be symmetric with each other, and may face each other. The first roller 341 may interwork with the wire 343, and the second roller 342 may be disposed to interwork with the support body 340. In addition, the first roller 341 may rotate in a state of being in contact with the wire 343, and the second roller 342 may rotate in a state of being in contact with the support body 340.

For example, when the slider 320 is inserted or withdrawn, each of the first and second rollers 341 and 342 may rotate. At the same time, the wire 343 and the support body 340 may also move.

In a state where the slider 320 is inserted to the housing 311 (e.g., FIG. 3), part of the support body 340 may be in a state of being in contact with an outer circumferential face of the second roller 342, and the rest of it may be disposed adjacent to the second cover 311*b* of the housing 311. In a state where the slider 320 is withdrawn from the housing 311 (e.g., FIG. 4), part of the support body 340 may be in a state of being in contact with the outer circumferential face of the second roller 342, and the rest of it may be disposed as a prop of the expanded display area.

In addition, in a state where the slider 320 is inserted to the housing 311, part of the wire 343 may be in a state of being in contact with an outer circumferential face of the first roller 341, and the rest of it may be in a state of being disposed to have a gap at a bottom face of the expanded display area. In a state where the slider 320 is withdrawn from the housing 311, part of the wire 343 may be in a state of being in contact with the outer circumferential face of the first roller 341, and the rest of it may be adjacent to face the second cover 311*b* of the housing.

Figure 6:
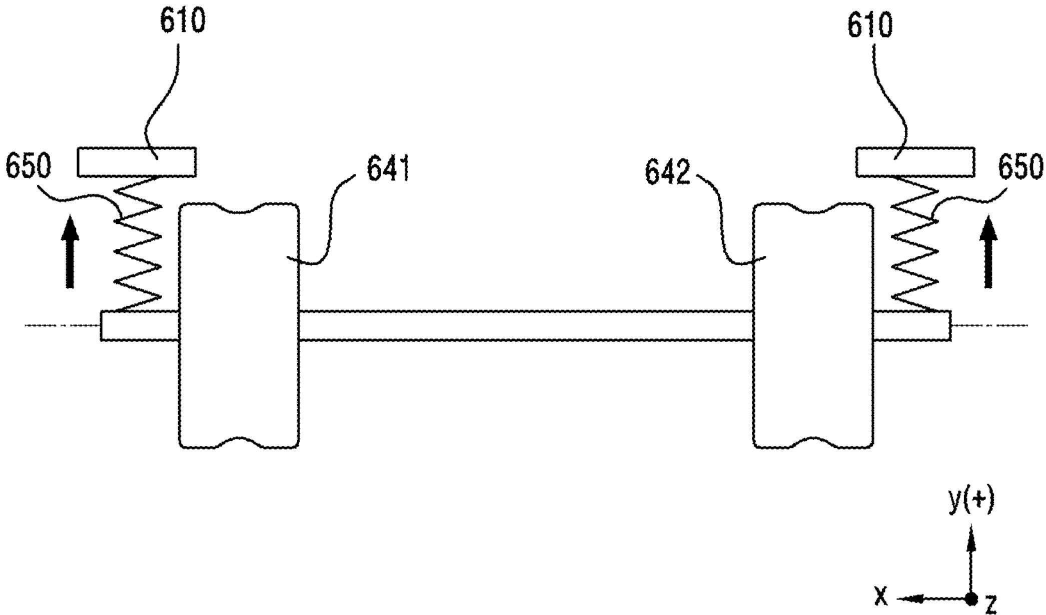
FIG. 6 is an exemplary view briefly illustrating a state where a first roller of a smoothness maintaining device is supported by an elastic body according to various embodiments of the disclosure.

FIG. 6 is an exemplary view briefly illustrating a state where a first roller of a smoothness maintaining device is supported by an elastic body according to various embodiments of the disclosure.

Referring to FIG. 6, a smoothness maintaining device according to various embodiments may further include an elastic body 650. The elastic body 650 is a compression coil spring, and may provide force for pulling the first roller 641 in a direction away from the second roller 642. Since the first roller 541 is always provided with the force away from the second roller 642, a support body can always retain force for smoothness, and an expanded display area can maintain the smoothness. For example, the elastic body 650 is not limited to the spring. In the elastic body 650 according to various embodiments, one end may be fixed to part of the housing 610, and the other end may be fixed to a shaft 's' of the first roller.

Figure 7A:
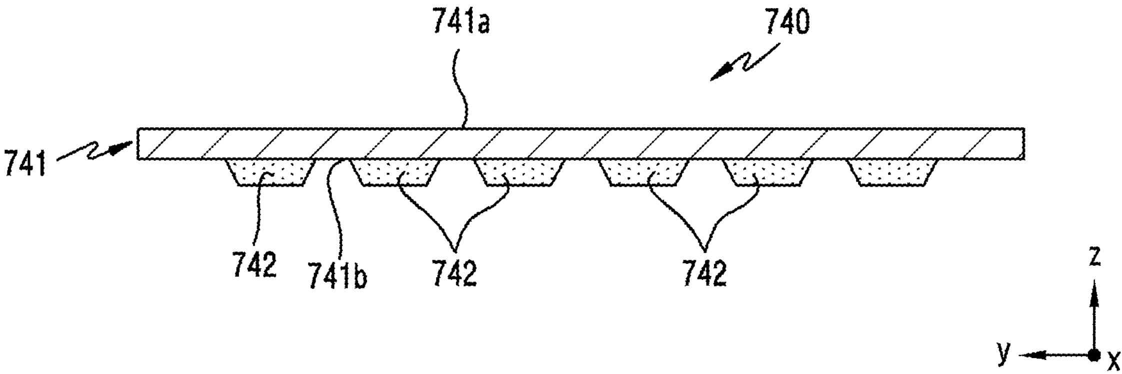
FIG. 7A is a cross-sectional view illustrating various examples of support bodies according to various embodiments of the disclosure.
Figure 7B:
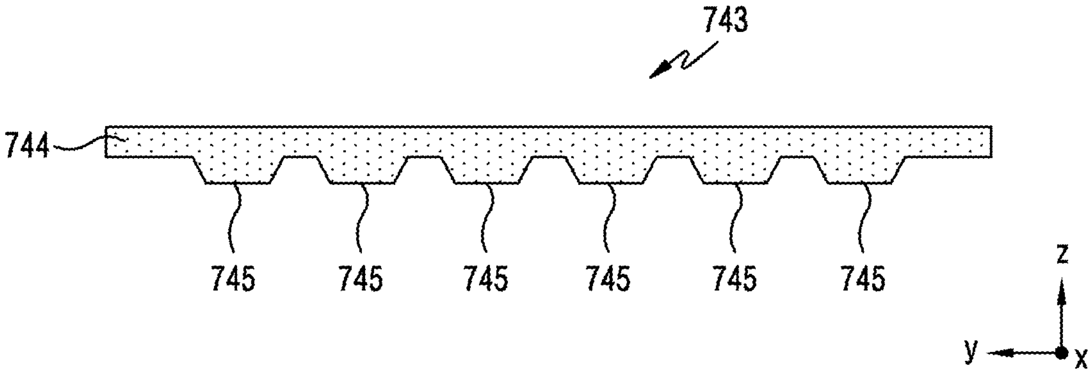
FIG. 7B is a cross-sectional view illustrating various examples of support bodies according to various embodiments of the disclosure.
Figure 7C:
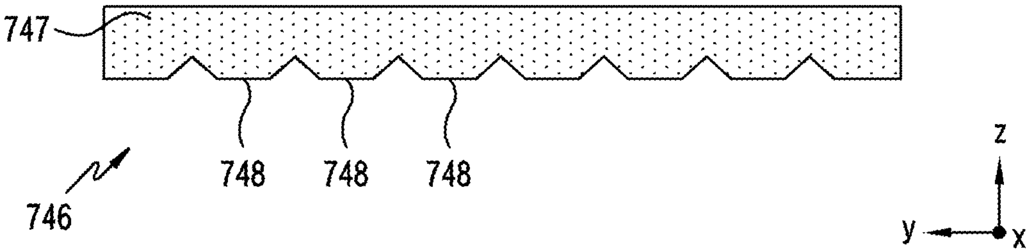
FIG. 7C is a cross-sectional view illustrating various examples of support bodies according to various embodiments of the disclosure.

FIG. 7A to FIG. 7C are cross-sectional views illustrating various examples of support bodies according to various embodiments of the disclosure.

Referring to FIG. 7A, a support body 740 according to various embodiments may be configured in the same manner as the support body 340 of FIG. 3 to FIG. 5. The support body 740 according to various embodiments may include a flexible film 741, and a plurality of protrusions 742 attached to one face of the flexible film 741. The flexible film 741 may include a first face 741*a* closely in contact with one face of the flexible display, and a second face 741*b* facing away from the first face 741*a*.

The protrusions 742 according to various embodiments may be disposed with an equal interval on the second face 741 of a flexible film along a direction (an X-axis direction) perpendicular to an inserting/withdrawing direction. However, the protrusions 742 are not necessarily limited to being disposed with the equal interval, and may be disposed to be coupled with each other.

For example, a cross-section of the protrusion 742 may be configured in an isosceles trapezoidal shape. However, the cross-section of the protrusion 742 is not limited to the isosceles trapezoidal shape, and may be configured in a shape of quadrangle, square, rectangle, semicircle, or the like. For example, each of the protrusions 742 may be constructed of a Poly Oxy Methylene (POM) material.

The flexible film 741 according to various embodiments may be configured to have substantially the same area as the expanded display area. In addition, an area in which the plurality of protrusions 742 are disposed may be substantially similar to a size of the flexible film 741, and may be substantially similar to the expanded display area.

Referring to FIG. 7B, a support body 743 according to various embodiments may include a film portion 744 and a plurality of protrusions 745 which are integrally injection molded to the film portion 744. For example, the film portion 744 and the protrusion 745 may be produced integrally. Each of the protrusions 745 may be disposed on one face of the film portion 744 with an equal interval in a direction perpendicular to an inserting/withdrawing direction of a slider.

For example, a cross-section of the protrusion 745 may be configured in an isosceles trapezoidal shape. However, the cross-section of the protrusion 745 is not limited to the isosceles trapezoidal shape, and may be configured in a shape of quadrangle, square, rectangle, semicircle, or the like.

Referring to FIG. 7C, a support body 746 according to various embodiments may include a film portion 747 and a plurality of protrusions 748 which are integrally molded to the film portion 747. For example, the film portion 747 and the protrusion 748 may be produced integrally. The protrusions 748 may be disposed on one side face of the film portion 747 so as to be in contact with each other in a direction perpendicular to an inserting/withdrawing direction of a slider.

For example, a cross-section of the protrusion 748 may be configured in an isosceles trapezoidal shape. However, the cross-section of the protrusion 748 is not limited to the isosceles trapezoidal shape, and may be configured in a shape of quadrangle, square, rectangle, semicircle, or the like.

Figure 8:
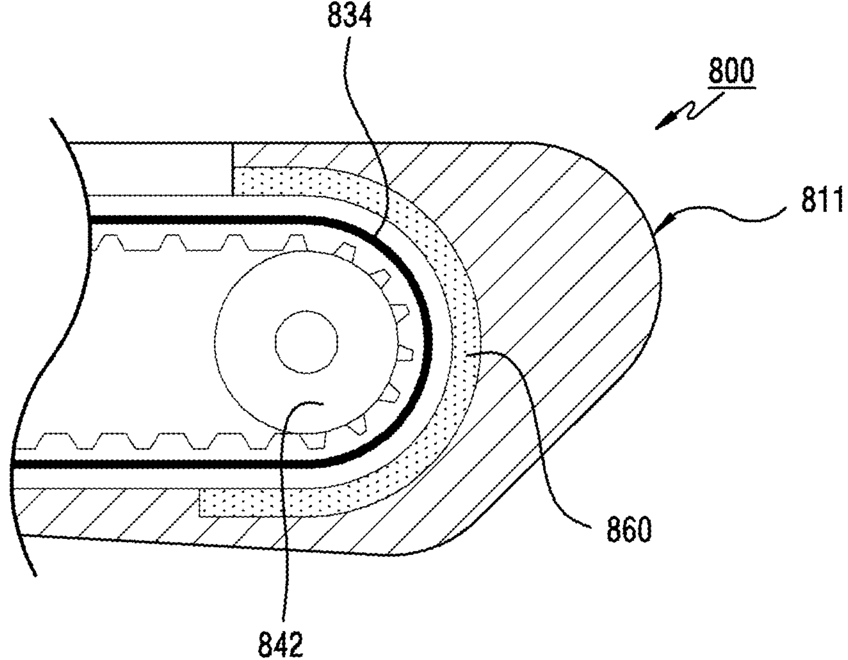
FIG. 8 is a cross-sectional view illustrating an anti-scratch device of an expanded display area according to various embodiments of the disclosure.

FIG. 8 is a cross-sectional view illustrating an anti-scratch device of an expanded display area according to various embodiments of the disclosure.

Referring to FIG. 8, an electronic device 800 according to various embodiments may be the same electronic device as the electronic device 100 of FIG. 1 and FIG. 2. A housing 811 of the electronic device 800 according to various embodiments may further include an anti-scratch device 860 of an expanded display area 834, in proximity to a second roller 842. When a slider is inserted or withdrawn, the expanded display area 834 may be scratched in some lower end portions of the housing 811 while being inserted or withdrawn. Thus, the anti-scratch device 860 may be disposed in a portion of the housing 811 which may be interfered with the expanded display area 834.

The anti-scratch device 860 according to various embodiments may be disposed to a lower end of the housing 811, and may be configured as at least one anti-friction member disposed to face at least part of an outer circumferential face of the second roller 842.

Figure 9:
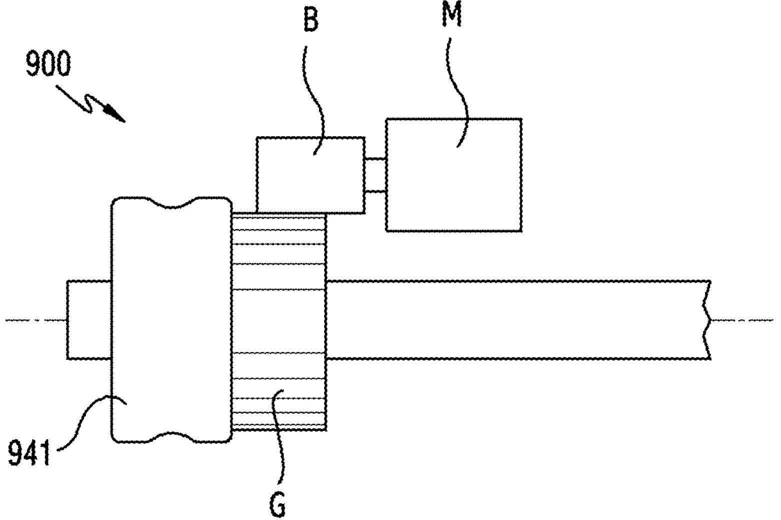
FIG. 9 is an exemplary view briefly illustrating an automatic inserting/withdrawing device included in an electronic device according to various embodiments of the disclosure.

FIG. 9 is an exemplary view briefly illustrating an automatic inserting/withdrawing device included in an electronic device according to various embodiments of the disclosure.

Referring to FIG. 9, an electronic device 900 according to various embodiments may be the same electronic device as the electronic device 100 of FIG. 1 and FIG. 2. The electronic device according to various embodiments may automatically configure a driving source for performing an operation of inserting or withdrawing a slider in a main body.

For example, a device for automatically inserting/withdrawing the slider may include a gear G provided coaxially with a first roller 941, a driving motor M, and a gear box B disposed between the gear G and the driving motor M to decrease a rotation count of the driving motor M. The gear box B may be configured as an array of at least one gear.

In addition, a rack 331 to be engaged with the gear may be further included in the slider. The rack 331 is illustrated in FIG. 4.

When the driving motor M is driven, rotation force is transferred to the gear box B, and the transferred rotation force is transferred to the gear G. According to the rotation of the gear B, the first roller 941 also rotates simultaneously. The slider may be inserted or withdrawn due to the rack 331 engaged with the gear G. According to inserting or withdrawing of the slider, the flexible display may also be inserted or withdrawn.

Various embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

What is claimed is:

1. An electronic device comprising:
a main body;
a slider slidably moved to the main body, wherein the slider is at least partially inserted to the main body and is at least partially withdrawn from the main body;
a flexible display comprising a first area and a second area, wherein the first area is exposed when the slider is fully inserted to the main body, and wherein the second area of the flexible display is inserted to the main body when the slider is fully inserted to the main body;
a flexible support member disposed at a bottom face of the flexible display; and
a smoothness maintaining device comprising a wire coupled to the flexible support member,
wherein a first end of the wire is connected to a third end of the flexible support member and a second end of the wire is connected to a fourth end of the flexible support member.

2. The device of claim 1, wherein tension is applied to the flexible support member, while the slider slidably moves to the main body.

3. The device of claim 2,
wherein the smoothness maintaining device further comprises:
a first roller rotatably disposed at a first position of the main body, and
a second roller rotatably disposed at a second position of the main body,
wherein the first roller and the second roller are surrounded by the wire and the flexible support member which are connected each other.

4. The device of claim 3,
wherein the first roller is at least partially surrounded by the wire, and
wherein the second roller is at least partially surrounded by the flexible support member.

5. The device of claim 3,
wherein the first roller rotates about a first axis, and
wherein the second roller rotates about a second axis.

6. The device of claim 5,
wherein a third end of the flexible support member is moved toward to the first roller by a first end of the wire, as the second roller rotates about the second axis, and
wherein a second end of the wire is moved toward to the second roller by a fourth end of the flexible support member, when the first roller rotates about the first axis.

7. The device of claim 6, wherein the tension is applied to the flexible support member, as the first roller rotates about the first axis and the second roller rotates about the second axis.

8. The device of claim 5, wherein the wire and the flexible support member connected each other are rotate along the first roller and the second roller.

9. The device of claim 8, wherein the flexible support member is fixed closely in contact to the second area in an integral manner to move together with the flexible display.

10. The device of claim 3, wherein a first end of the wire and a second end of the wire move in parallel with the flexible display while maintaining a specific interval from each other.

11. The device of claim 2, wherein the flexible support member comprises:
a flexible film including a first face disposed at the bottom face of the flexible display, and a second face facing the first face; and
a plurality of protrusions disposed on the second face of the flexible film.

12. The device of claim 11, wherein an area in which the plurality of protrusions are disposed is corresponding to the second area.

13. The device of claim 11, wherein the plurality of protrusions are configured to be spaced apart from each other, or are configured integrally to be disposed with an equal interval.

14. The device of claim 11,
wherein a cross section of the plurality of protrusions are isosceles trapezoidal, and
wherein the plurality of protrusions is integrated with the flexible film.

15. The device of claim 3, further comprising:
an anti-scratch member disposed adjacent the second roller in the main body,
wherein the anti-scratch member for preventing a scratch to the second area of the flexible display, while the slider is inserted to the main body or is withdrawn from the main body.

* * * * *